Jan. 11, 1938.   P. J. KIRCHER   2,105,219
SCALE
Filed June 3, 1936   2 Sheets—Sheet 1

INVENTOR
Paul J. Kircher
BY
Duell Kane + Smoot
ATTORNEYS

Jan. 11, 1938.  P. J. KIRCHER  2,105,219
SCALE
Filed June 3, 1936  2 Sheets-Sheet 2
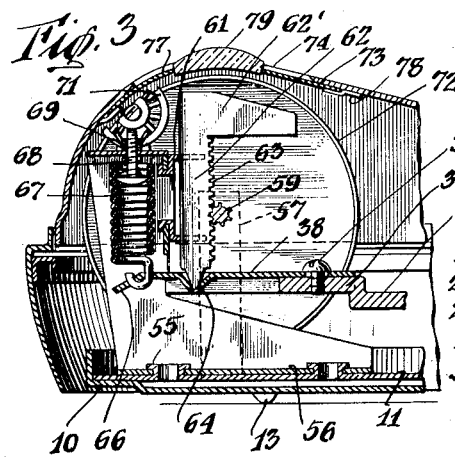
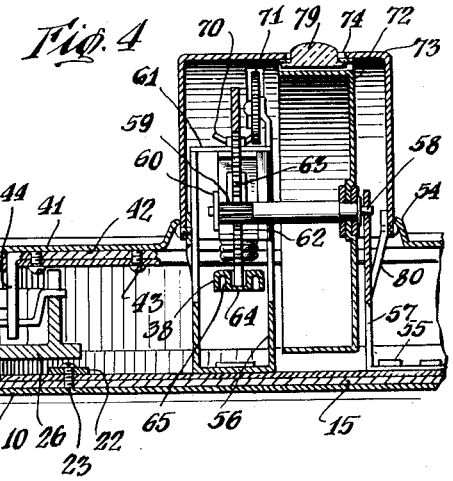
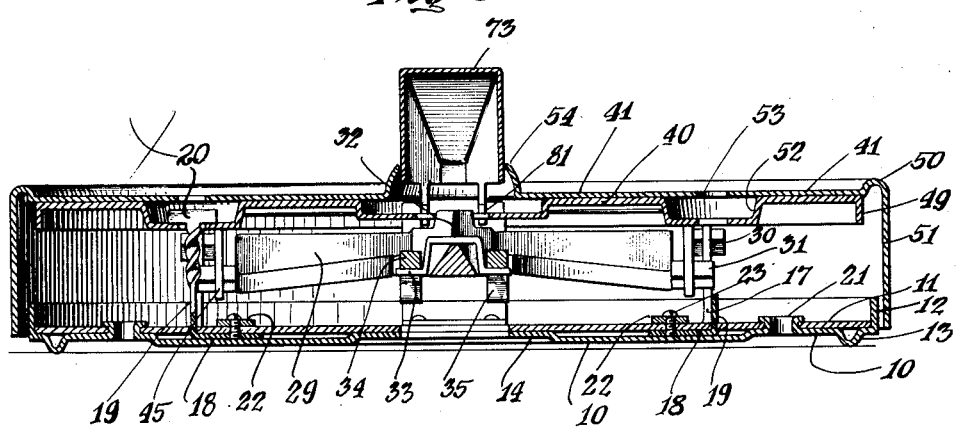
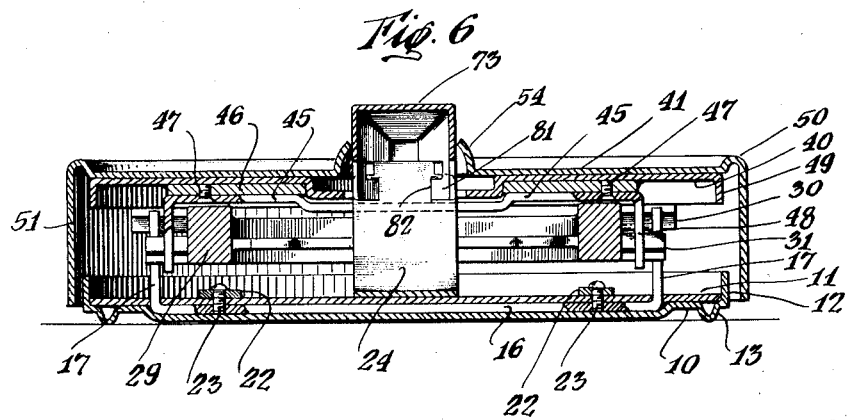
INVENTOR
Paul J. Kircher
BY
Duell, Kane — Smart
ATTORNEYS Patented Jan. 11, 1938

2,105,219

UNITED STATES PATENT OFFICE 2,105,219

SCALE

Paul J. Kircher, Brooklyn, N. Y., assignor to The Jacobs Bros. Co. Inc., Brooklyn, N. Y., a corporation of New York Application June 3, 1936, Serial No. 83,257

6 Claims. (Cl. 265—68)

This invention relates to a structurally and functionally improved scale, and in its more specific aspects aims to provide an article of this character particularly intended for household and personal use.

It is an object of the invention to provide a domestic or personal type scale of the so-called "bathroom" type, which scale will present a structure such that there will be no tendency for the scale platform to tip or otherwise move in a disconcerting manner even if the person using the same does not stand precisely upon a certain designated zone of the platform.

A further object of the invention is that of constructing an apparatus of this character which will provide for a very exact type of weight indication, despite the fact that the scale may not be primarily designed for commercial purposes—in which, of course, the degree of accuracy in weight indication must be very exact.

A still further object of the invention is that of furnishing a scale of pleasing design which will embody relatively few parts, each individually simple and rugged in construction, these parts being capable of manufacture by quantity methods of production and being, moreover, susceptible to ready assemblage, resulting in a scale which may thereupon be quickly "set-up", such assemblage being capable of achievement by relatively unskilled labor with a minimum of effort. Accordingly a compact apparatus is furnished which may be sold for a relatively nominal figure and which will give relatively satisfactory service over long periods of time.

While the present invention is—as afore brought out—primarily dedicated to providing scales of the non-commercial type, it is to be understood that certain, if not all, of the teachings of the present invention might be employed to advantage in producing scales having an accuracy factor such that the resultant apparatus may be utilized for commercial purposes. Accordingly, it is to be understood that the invention is not limited to scales of the bathroom and similar types.

With these and other objects in mind, reference is had to the attached sheets of drawings, illustrating one practical embodiment of the invention, and in which:

Fig. 3 is a fragmentary sectional view taken along the lines 3—3 and in the direction of the arrows as indicated in Fig. 1;

Figure 1:
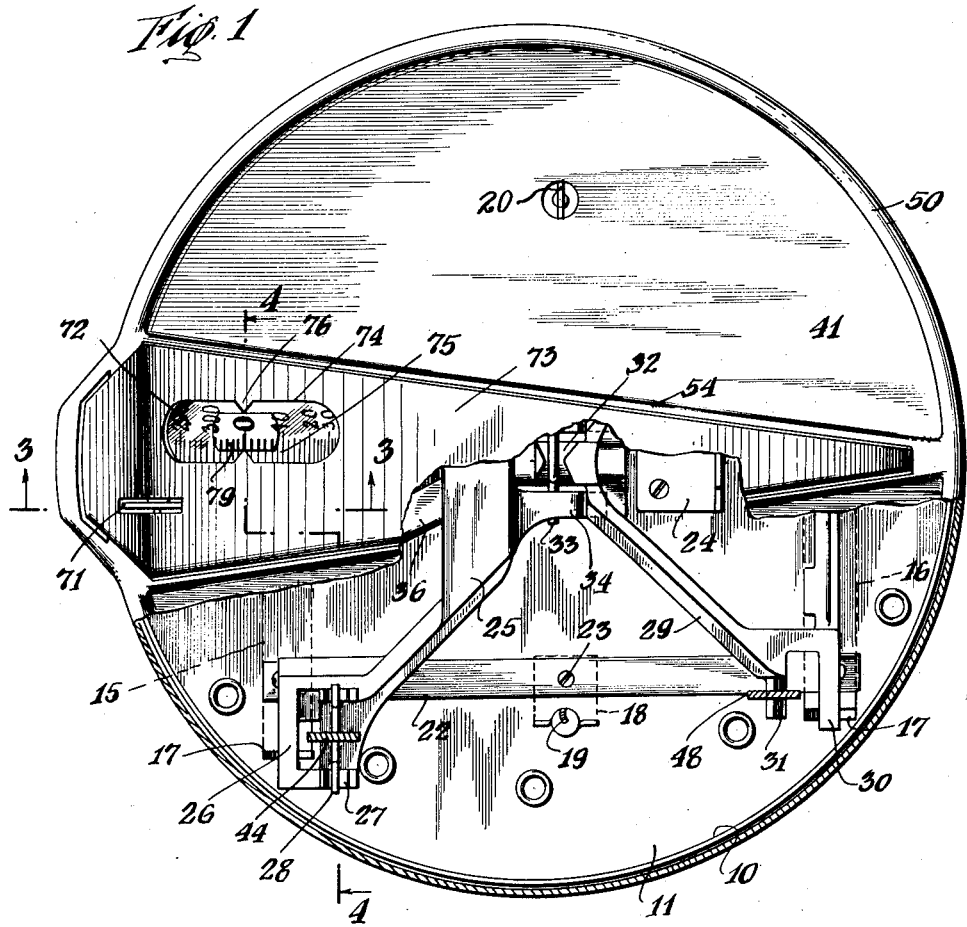
Fig. 1 is a plan view of a scale with a portion of the platform and housing broken away to disclose the underlying construction.
Figure 2:
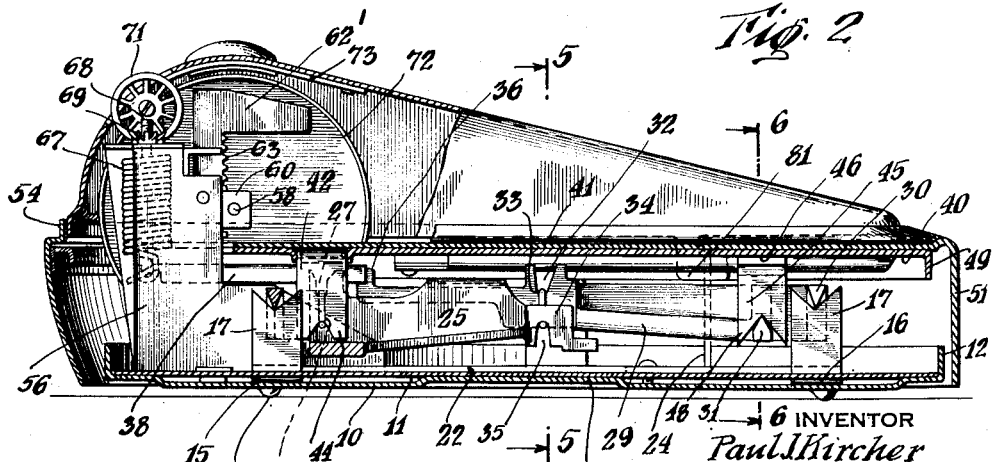
Fig. 2 is a sectional side view of the scale.

Fig. 4 is a transverse sectional view taken along the lines 4—4 and in the direction of the arrows as also indicated in Fig. 1, and Figs. 5 and 6 are transverse sectional views taken along the respective lines and in the direction of the arrows as indicated at 5—5 and 6—6 in Fig. 2.

In these views it will be observed that the base of the scale preferably includes a pair of plates 10 and 11. The outer or lower plate preferably has an upstanding flange 12 adjacent its edge, the inner plate being of an area such that it fits snugly within the space defined by this flange. The lower or outer plate 10 may be indented or bulged downwardly, as indicated at 13, to provide foot or supporting portions for the base. Moreover, such plate may have upwardly bulged portions 14 which, in cooperation with the lower or inner face of plate 11, serve to space the latter from the upper face of plate 10. In this manner adequate room is provided for the reception of straps 15 and 16 which have their bodies lying between the plates and the ends of which may be extended upwardly through openings in the plate 11. At such points the strap ends are preferably formed to provide beam supporting bearings 17. The space between the plates is also adequate to accommodate any other members. For example, the ends 18 of the platform retaining elements may be disposed within this space and secured against dislodgement in any desired manner. These elements may have any desired and proper configuration, but according to the teachings of the present invention, preferably include bodies 19 terminating in enlarged head portions 20.

With a view to securing the plates against detachment with respect to each other, the lower one may be formed with upwardly extending collar or eyelet portions 21. These project through openings formed in plate 11. When the parts are assembled, these eyelets or collars are flanged over in the manner probably best shown in Figs. 1 and 5, and it is thus obvious that a permanent and rigid structure is provided in which there will be no danger of relative movements occurring. As is also shown, the base may be rigidified by positioning strengthening strips or rib members 22 upon the upper face of plate 11. These strips may be secured in place in any desired manner as, for example, by welding, or providing fastening elements 23 which extend through openings in these strips and the plate 11 and are threaded into correspondingly threaded openings in the ends 18 of the platform retaining elements, as has been best shown in Figs. 1 and 5. Of course, additional and similar retaining elements 23 may be provided in line with straps 15 and 16, as has been best shown in Figs. 4 and 6.

Still considering the base assembly, it will be observed that the plate 11 may mount an upwardly extending enclosure mounting member 24, the purpose of which will be hereinafter more particularly pointed out. Positioned above the base are a pair of beams. The first of these preferably include a V-shaped body 25, the ends of which terminate in U-shaped portions 26. The base of the latter portions provide knife-edge bearings which rest within the crotch portions of the beam supporting bearings of strap 15. Between the arms of each of these U-shaped end portions, so-called loop members are mounted. With this in view these arms may, in their upper edges, define notch portions 27 to receive the ends 28 of the loop members, the bodies of which extend downwardly and across the space intervening the arms, these members in each instance supporting the platform as hereinafter brought out.

A second beam 29 of generally Y-shape is also provided upon the base. Adjacent the ends of its arms it is provided with bearing portions 30 which rest within the V-shaped notches of bearing member 17 as defined by the ends of strap 16. At points short of the ends of these arms, it is provided with upwardly extending knife-edge bearings 31. Adjacent the point of juncture of its arms the beam 29 is formed in its upper edge with a notch portion 32 within which the base of a loop member 33 rests. This notch portion is disposed in line with extensions 34 projecting from the base of beam 25 and these extensions are, in each instance, notched as at 35 in their lower edge portions so as to receive the ends of loop member 33, thus coupling the beams one to the other. As has probably been best shown in Fig. 3, the base 36 of beam 29 terminates in a ledge 37, to which the end of a tail-piece 38 is secured in any desired manner as, for example, by a screw 39. At this time it should be noted, however, that this connection is preferably of such a nature that the tail-piece may be shifted longitudinally of the beam body so that proper adjustment of the parts may be made as the scale is "set up".

Now, referring to the platform structure it will be observed that this preferably includes, as shown, an inner plate 40 which is in face to face contact with an upper plate 41. The latter usually receives a mat or covering (not shown) so as to attractively dress the same. The plate 40 is channeled in line with loop elements 28 and at this point receives the body of strap member 42 which may be secured thereto in any desired manner as, for example, by fastening elements 43. The ends of this element are extended through openings into the plate 40 and provide bearing portions 44 resting against the base of the loop elements 28. In line with bearing portions 31 a similar strap element 45 may be provided. This element may, of course, be mounted in a manner similar to that shown in connection with element 42 in Fig. 4. However, it is preferably mounted as best shown in Fig. 6, in which it will be observed that spacing strips 46 are interposed between the strap element and the inner plate 40 of the platform, the entire assemblage being secured in place by fastening elements 47 or otherwise, as may be desired. The ends of strap 45 are extended downwardly to furnish bearing portions 48 which engage the knife-edge elements 31.

It is accordingly obvious that an extremely rigid platform structure is furnished and that this structure is properly supported upon the beam assembly and the latter is, in turn, properly supported upon the base. At this time it will also be noted that the platform, according to the present invention, is preferably circular or of substantially circular outline, and the inner plate 40 may be flanged downwardly as at 49 adjacent its edge portions so as to include strengthening factors such, that danger of distortion will be almost entirely overcome. Moreover, by having a platform of circular outline, ample areas are provided to each side of the center zone of the platform to accommodate the feet of the user without interfering with the registering mechanism and its housing, which will be more particularly described hereinafter. As has been especially brought out in Fig. 1, the beams 25 and 29 have the ends of their arms spaced a distance such that the platform will be inherently stable, this being especially apparent when one considers the beam end structures 25 26 and 30—31 and the manner in which the platform is mounted thereby as well as the manner in which these beams are in turn supported by the base.

Before departing from consideration of the platform it is to be noted that the side edges of the platform plate 41 are preferably bulged upwardly as indicated at 50 to provide a lip defining the edge of the platform mat, and these edge portions are then flanged downwardly as at 51 to preferably overlap the upwardly extending edge portions 12 of plate 10 so that an extremely unitary construction will be presented to the user. Additionally, it will be observed that when the parts are once assembled, there will be no danger of these parts becoming displaced so long as displacement of the platform with reference to the base is prevented. To this end and as has been previously brought out, the platform-retaining elements 18 are provided. The heads 20 of the latter extend through openings in the base of cup-shaped depressions 52 formed in plate 40. These openings have a length such that they permit of the passage of heads 20 but their width is sufficiently reduced so that no withdrawal of the heads is possible after the latter have been twisted. Plate 41 is provided with openings 53 through which a suitable implement is projected for the purpose of effecting such twisting, it being obvious, as shown in Fig. 5, that if bodies 19 are thus manipulated the parts will be locked against improper relative movements. Should it be necessary, however, to cause a disassembly of the parts, this may readily be done by simply removing the mat (not shown) and bringing the head portions 20 back to a position at which they align with the openings in the base of cup portions 52 and with the longitudinal dimension of such openings. Finally, with reference to the platform, it will be noted that the latter provides a central opening through both plates 40 and 41, the edges of this opening being defined by an upstanding flange 54.

Now considering the mechanism which resists movement on the part of the platform and its associated units, and which translates into weight indication the value of any depression which is effected on the part of the platform, it will be observed that plate 11 may be formed with a series of eyelets or collars 55 adjacent that portion of the base which mounts strap 15. A supporting plate 56 of U-shaped configuration is formed with openings through which these collar elements or eyelets extend. Thereafter certain of the latter are flanged over to lock the plate 56 against detachment or movement with respect to the base. A second plate 57 which may be L-shaped is also formed with openings through which the other eyelet or collar elements may be extended after which they are headed over to lock the parts against movement. Plate 57 is formed with an opening to rotatably mount the end of a pinion shaft 58. The latter is formed with or mounts a pinion 59. The end of shaft 58 beyond the pinion is rotatably supported within an extension 60 forming a part of plate 56. Also extending from this plate are brackets 61 which have their outer edges notched to slidably bear against the body 62 of a rack member. Formed in the opposite edge of this body are teeth 63 engaging the teeth of pinion 59. The body preferably terminates in a lower end which may be tapered to rest within a corresponding recess 64 formed centrally of the tail-piece 38 and which—as will be noted in Fig. 4—has side portions 65, adjacent the corresponding faces of body 62 to prevent any sidewise displacement. Such displacement is also, of course, prevented by bracket 61. As will, moreover, be noted, the angle defining the end portion of body 62 is more acute than the angle defining the socket within which said body rests. In this connection no binding may occur and a bearing action result. The upper part of body 62 is provided at 62' with an overhanging portion which will constantly tend to force the teeth 63 to contact with the teeth of pinion 59. At a point beyond the recess or socket 64 the tail-piece 38 may be extended downwardly as at 66. The lower end of a spring 67 is suitably coupled to this portion and the upper end of this spring may mount a bolt 68. While such mounting can be effected in numerous different manners, it is preferred that the head of the bolt be sufficiently large to have its edge extending between the convolutions of the spring. Accordingly it becomes an easy matter to twist the bolt and thus shift the same axially of the spring. The body of the bolt extends upwardly and through an opening in plate 56. It is accordingly obvious that as wheel 71 is turned, nut 69 will be rotated to thus raise and lower the spring and shift beam 25.

Incident to such shifting, drum 72 mounted by shaft 58 will be turned. Forming a part of the registering mechanism and enclosing the same is a housing 73. This housing conforms in general contour to the opening extending across the platform, and the flange 54 should preferably be quite closely spaced to the outer face of such housing. Accordingly, an extremely compact and unitary appearance of the parts is preserved. Adjacent the drum 72 the housing is furnished with a sight opening 74 through which the weight indicating graduations 75 appearing upon the periphery of the drum are visible. This opening may also have an indicating or registering portion or portions 76 by means of which the operator may readily determine the exact weight indication which is being registered. As illustrated, the housing is preferably wedge-shaped to conform to the contour of the platform opening. While according to the present invention such contour is preferable, it will be apparent that other configurations might be employed.

In certain instances it may be desired to emphasize the weight value which is being registered. In such case, and according to the teachings of the present invention, the sight opening 74 may be covered by a strip 77 of transparent or other suitable material. This strip has its ends secured against movement with respect to the casing as, for example, by engaging clips 78 associated with the inner face adjacent the opening thereof. The strip may also mount a lens 79 through which the numerals or other indicia 75 will be visible in magnified condition. The end of casing 53 which is adjacent the registering mechanism may be supported in any desired manner as, for example, by being secured to extensions 80 which form parts of plates 56 and 57 respectively. At a point short of its opposite end it may be formed with hook-shaped extensions 81 which project into openings 82 formed in the plate 24. As a consequence the housing will be properly and rigidly supported although it may readily be detached after the scale platform has been lifted from the base.

With the platform and base portions built up in the manner aforedescribed, it is obvious that the beams may be placed upon the bearing members provided for their support and these beams may be interconnected. Thereafter the end of bolt 68 may be passed through the opening in plate 56 and the nut may be threaded onto the end of the bolt. Likewise, the rack bar is dropped into position, care being taken so that upon assuming its final position, a zero weight indication will occur on the part of the registering mechanism. At this time the tail-piece 38 may be shifted with reference to the end portion 36 of beam 25 so that the parts are properly aligned. Also the bolt may be turned with reference to spring 67 if major adjustment is necessary. The housing 73 is now shifted to a position such that the hook-shaped projections 81 extending from its lower edge will engage with the openings 82 of plate 24. Thereafter the rear end of the housing may be secured in position. The platform is now brought to the position shown in the drawings and the heads 20 are allowed to pass through the openings in the cup-shaped depressions 52. Thereafter these heads may be twisted through 90° or else turned several times, as shown in Fig. 5, so that displacement of the parts is precluded. The mat may now be positioned upon the upper plate of the platform to cover the openings 53, and the scale mechanism is now ready for use. In such use it is apparent that, as afore brought out, an extremely stable form of mechanism is presented, permitting of the use of a circular or substantially circular platform, and depression of the platform will cause beams 25—29 to be swung with respect to the portions mounting the same, thus causing a depression of tail-piece 38 against the resistance offered by spring 67 and a corresponding movement on the part of the registering mechanism.

Thus among others the several objects of the invention as specifically aforenoted are achieved. It is obvious that numerous changes in construction and rearrangement of the parts might be resorted to without departing from the spirit of the invention as defined by the claims.

Having described my invention, what I claim as new and desire to secure by Letters Patent is:

1. As an article of manufacture, a scale base including a pair of plates having portions of their adjacent faces spaced from each other, means for securing said plates one to the other, a strap interposed between said plates and disposed in line with the spaced portions thereof and in intimate contact with said plates, the upper of said plates being formed with an opening, the end of said strap being extended upwardly through said opening and terminating in a bearing portion, and means for securing said plates against movement with respect to each other and with respect to said strap.

2. A scale including a base comprising a pair of plates disposed in face to face contact, one of said plates being formed with recesses, straps disposed within said recesses, the second of said plates being formed with openings, and the ends of said straps providing bearing portions and being extended upwardly through said openings.

3. A scale including a base comprising a pair of plates disposed in face to face contact, one of said plates being formed with recesses, straps disposed within said recesses, the second of said plates being formed with openings, the ends of said straps providing bearing portions and being extended upwardly through said openings, reinforcing members disposed upon the upper of said plates, and means for securing said reinforcing members against movement with respect to said plates and extending into engagement with said straps to retain the latter against movement.

4. As an article of manufacture, a scale platform including a pair of plates arranged in face to face contact, portions of said plates being spaced from each other, a strap interposed between said plates and arranged in line with the spaced portions thereof and in intimate contact with the inner faces of such portions, the end of said strap including a bearing portion, one of said plates being formed with an opening, and said bearing portion extending through said opening.

5. As an article of manufacture, a scale platform including a pair of plates, a strap interposed between said plates, the end of said strap including a bearing portion, one of said plates being formed with an opening, said bearing portion extending through said opening, and cup shaped depressions formed with openings in their base portions, said depressions forming a part of said second plate and being adapted to accommodate platform retaining elements.

6. As an article of manufacture, a scale platform including a pair of plates, a strap interposed between said plates, the end of said strap including a bearing portion, one of said plates being formed with an opening, said bearing portion extending through said opening, and flange portions adjacent the edges of said platform and the edges of both of said plates, the outermost of said flange portions being of greater length than the other of the same whereby to conceal the latter.

PAUL J. KIRCHER.